United States Patent [19]

Messina

[11] Patent Number: 4,949,936

[45] Date of Patent: Aug. 21, 1990

[54] ACTUATOR FOR ACTUATING VALVES

[76] Inventor: Aurelio Messina, Via Prealpi, 8, 20032 Cormano (Milano), Italy

[21] Appl. No.: 351,388

[22] Filed: May 12, 1989

[30] Foreign Application Priority Data

May 24, 1988 [IT] Italy .............................. 20716 A/88

[51] Int. Cl.[5] ...................... F16K 31/163; F15B 15/24

[52] U.S. Cl. ...................................... 251/58; 92/13.6; 92/136; 92/138; 251/62; 251/229; 251/250; 251/14

[58] Field of Search .................. 251/58, 62, 229, 248, 251/249.5, 250, 14; 92/13.5, 13.51, 13.6, 13.7, 69 R, 136, 138

[56] References Cited

U.S. PATENT DOCUMENTS 3,107,080 10/1963 Priese .................................. 251/58
3,199,416 8/1965 Robson ............................... 92/13.5
3,982,725 9/1976 Clark .................................... 92/136
4,087,074 5/1978 Massey et al. ........................ 251/58
4,167,897 9/1979 Bunyard .............................. 92/136
4,651,626 3/1987 Messina .............................. 92/136

FOREIGN PATENT DOCUMENTS 2128682 5/1984 United Kingdom .................. 92/136

*Primary Examiner*—George L. Walton
*Attorney, Agent, or Firm*—Bucknam and Archer

[57] ABSTRACT

The actuator comprises an actuator body including a cavity in which there are housed two pistons movable in opposite directions and including toothed portions meshing with a toothed pignon rigid with a shaft to be coupled to the spindle of the valve element to be actuated, there being moreover provided end of stroke abutment members which can be adjusted from the outside of the body and which are engaged by the pistons in order to adjust the opening and closing srokes of the valve element.

2 Claims, 3 Drawing Sheets

ACTUATOR FOR ACTUATING VALVES

BACKGROUND OF THE INVENTION

The present invention relates to an improved actuator for actuating a valve element in general.

As is known, there are commercially available actuators for opening and closing valve elements of several types which actuators usually comprise either hydraulic or pneumatic elements suitable to drive the driving spindle of the valve element to be acuated.

These known actuators are generally very complex construction-wise and, moreover, they do not afford the possibility of precisely adjusting, depending on requirements, the rotation angle of the valve element spindle.

SUMMARY OF THE INVENTION

Accordingly, the main object of the present invention is to overcome the above mentioned drawbacks by providing an improved valve actuator affording the possibility of easily and quickly adjusting the end of stroke positions of the valve element actuated thereby.

Another object of the present invention is to provide such an improved valve actuator which has a very reduced size and a high response speed so as to quickly switch from the valve element closing to the valve element opening position and/or vice versa.

Another object of the present invention is to provide such an improved actuator which is very reliable in operation and can be easily made, at a comparatively low cost, starting from easily available elements and materials.

According to one aspect of the present invention, the above mentioned objects, as well as yet other objects, which will become more apparent hereinafter, are achieved by an improved actuator for actuating valve elements in general, characterized in that said actuator comprises a body including a cavity in which two pistons can move in opposite directions, said pistons being provided with toothed portions meshing with a toothed pignon rigid with a shaft suitable to be coupled to a spindle of a valve element to be actuated, there being moreover provided end of stroke abutment members which can be adjusted from the outside of said body and contact engaged by said pistons to adjust the opening and closing strokes of said valve element.

SUMMARY OF THE INVENTION

Further characteristics and advantages of the present invention will become more apparent from the following detailed description of a preferred embodiment of an improved valve actuator according to the invention, which is illustrated, by way of an indicative but not limitative example, in the figures of the accompanying drawings, where:

DESCRIPTION OF THE PREFERRED EMBODIMENT

Figure 1:
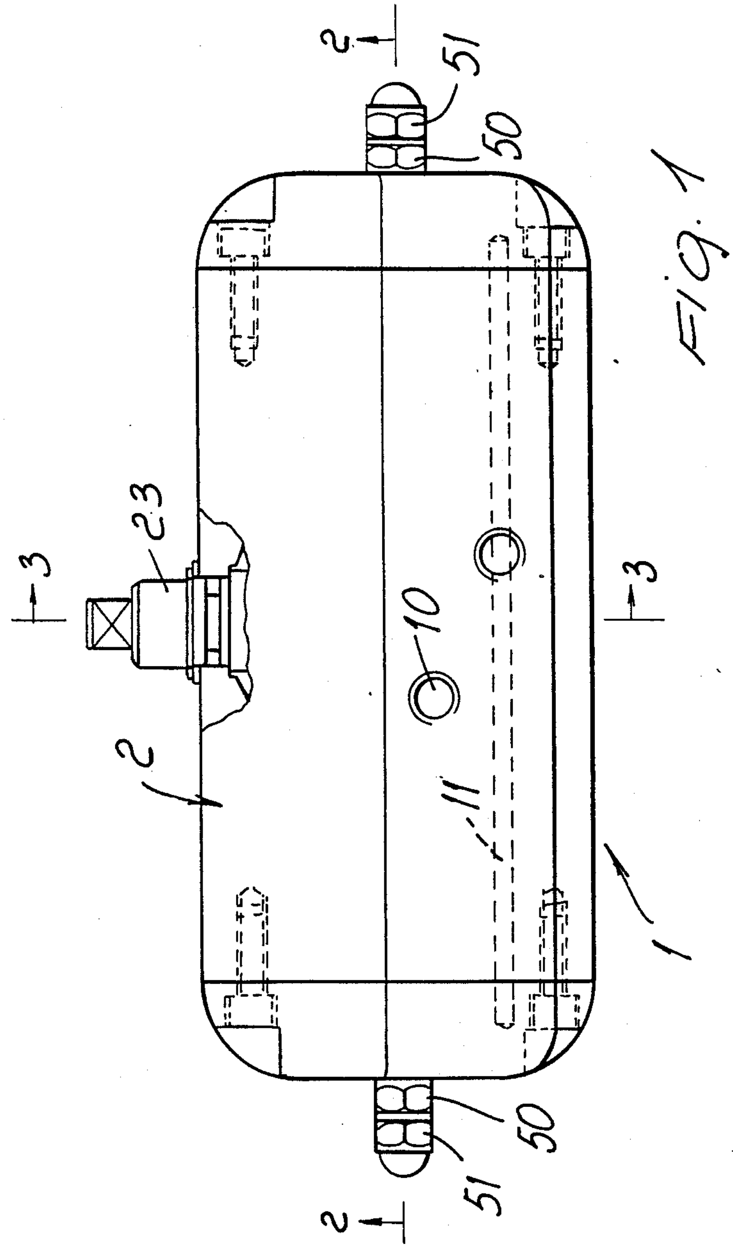
FIG. 1 is a partially cross-sectioned elevation view illustrating the valve actuator according to the present invention.

With reference to the figures of the accompanying drawings, the improved actuator for actuating valve elements in general according to the present invention, which is overally indicated at the reference number 1, comprises a body 2 in which there defined a preferably cylindrical cavity 3.

In this cavity two pistons 4 and 5 respectively can move in opposite directions:more specifically these pistons tightly move in a first and second chambers 6 and 7 which are opposite to one another and coupled to the longitudinal ends of the body 2.

To the cavity 3 a first pressurized air delivery duct 10 leads, and further air delivery duct, indicated at the reference number 11, communicate with the head portions of the chambers 6 and 7 so as to displace the pistons 4 and 5 in opposite directions.

The pistons 4 and 5 are provided, at the coupling side thereof, with toothed portions indicated respectively at 20 and 21 which extend according to rectilinear portions parallel to the piston sliding direction and engaging with a toothed pignon 22 which is rigidly mounted on a shaft 23, in turn rotatably supported by the body 2.

As shown, the shaft 23 tightly projects from the body 2 and, at its bottom portion, defines a seat 24, broached in its inside, in which can be engaged a fitting 25, provided with a corresponding outer broached portion for coupling with the spindle of a valve element on which the actuator must be applied.

Thus, the fitting 25 can be interexchanged so as to easily and quickly engage different shape valve spindles.

A main feature of the present invention is that there are provided end of stroke elements which can be directly adjusted from the outside of the body 2 and directly engage, by contact, with the pistons.

Figure 2:
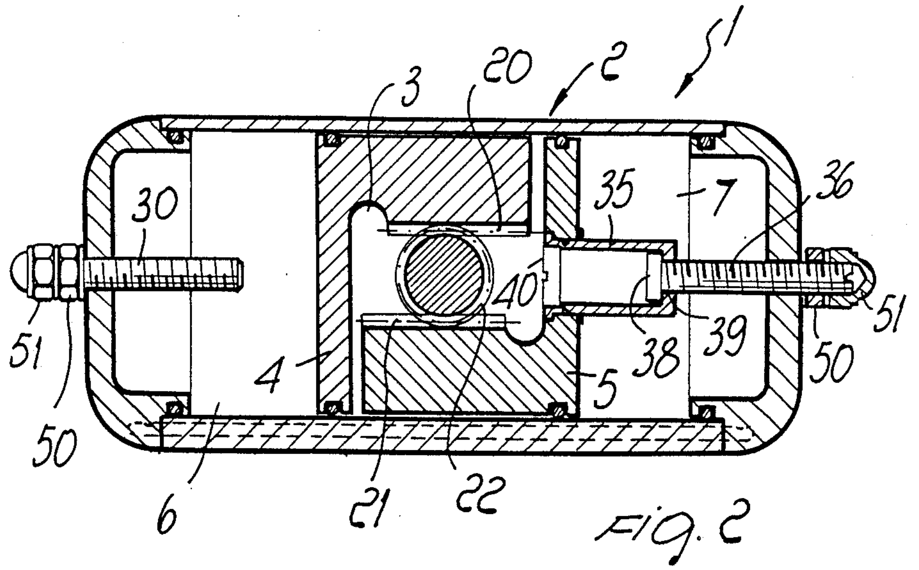
FIG. 2 is a cross-sectional view taken along the line II—II of FIG. 1.
Figure 3:
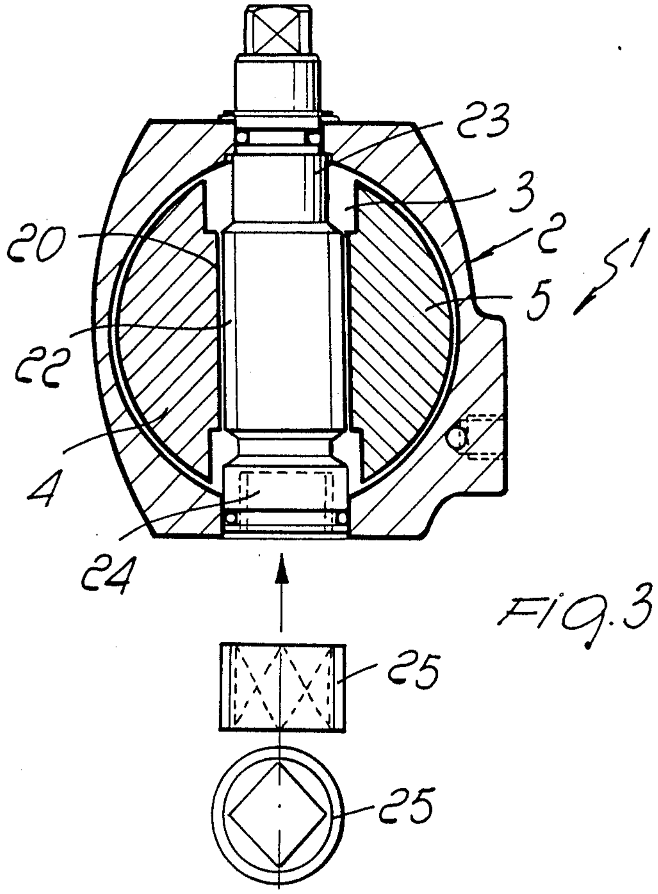
FIG. 3 is another cross-sectional view of the subject actuator, taken along the section line III—III of FIG. 1.
Figure 4:
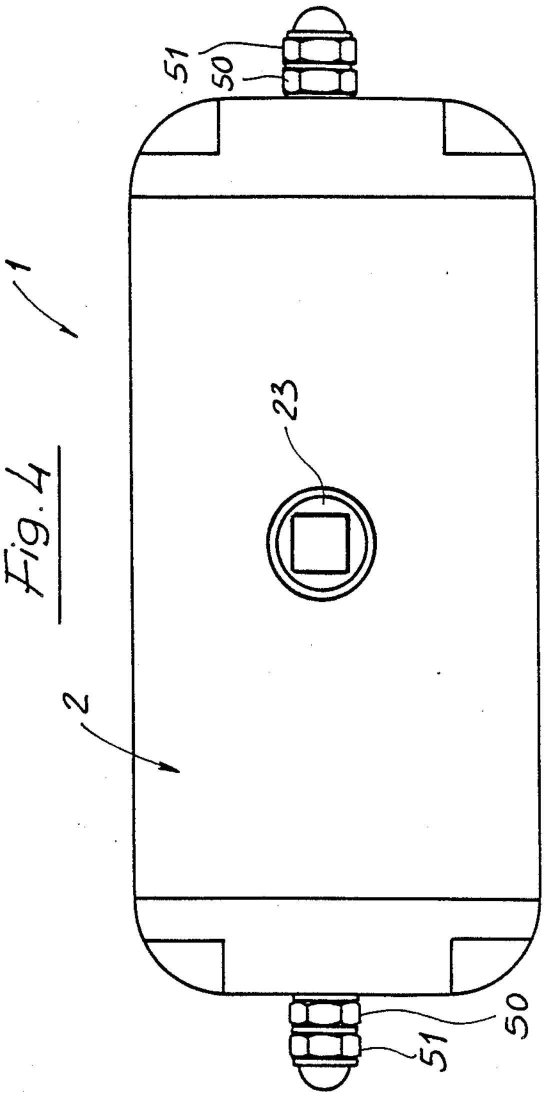
FIG. 4 is a plan top view illustrating the actuator according to the present invention.

Said end of stroke elements, as is clearly shown in FIG. 2, are provided with a first stem 30 which engages with the head of the portion of the chamber 6; this threaded stem 30 engaging, by contact, with the first piston 4 and operates as an abutment member for the displacement in a first direction of this first piston.

It should be apparent in this connection that, as the first piston is locked, also the other piston will be automatically locked because of the coupling between the mentioned toothed portions and the toothed pignon.

More specifically, the other piston 5 is provided with a cap bush 35 which is restrained on said piston 5 and engages with a second threaded stem 36 coupled to the other head of the chamber 7 and provided with an enlarged head portion 38 which butt engages with an annular narrowed portion 39 formed at the end of the bush.

Thus, the head portion 38 of the second stem will operate as a stop element for the displacement of the piston in the opposite direction to the direction in which the stem 30 operates as a stop member for the first piston.

It should be moreover be pointed out that the cap bush 35 is tightly coupled to the piston 5 and that, advantageously, said cap bush is provided with a closing plug at that portion of the bush facing the toothed pignon.

A micrometric adjusting can be carried out by means of nuts, indicated at 50, which allow for the stems to be properly arranged so as to cause the pistons to perform the desired stroke before the operation of said stems as end of stroke element.

On the two stems, moreover, there is provided a respective locking nut, indicated at 51.

By operating the stems 30 and 36 it will be possible to micrometrically change the positions of said stems, to precisely stop the pistons at the desired places, with a perfect adjusting of said pistons.

From the above disclosure, it should be apparent that the invention fully achieves the intended objects.

While the invention has been disclosed and illustrated with reference to a preferred embodiment thereof, it should be apparent that the disclosed embodiment is susceptible to several modifications and variations all of which will come within the spirit and scope of the appended claims.

I claim:

1. An improved actuator for actuating valve elements comprising a body including a cavity, said body having a pair of end caps for closing opposite ends thereof, said body having disposed therein two piston that can move in opposite directions, said pistons being provided with tooth portions meshing with a pignon rigid with a shaft including a seat in which are removably engaged fitting means for coupling said shaft to a spindle of a valve element performing opening and closing strokes, end of stroke limit means contact engaged by said pistons to adjust said opening and closing strokes of said valve element, said two pistons defining in said cavity a first and second opposite chambers communicating with pressurized air delivery ducts for driving said pistons, said end of stroke limit means being supported on head portions of said first and second opposite chambers, said end of stroke limit means including a first threaded stem rotatably supported by said head portion of said first chamber and suitable to contact engage with said first piston, and a cap bush associated with said second piston, said cap bush being associated with a second threaded stem which is rotatably supported and received within said cap bush, said second threaded stem having an enlarged stop head portion which abuts an annular narrowed portion formed at the end of said cap bush, said stop head portion will operate to stop displacement of the second piston in the direction opposite to the direction in which said first threaded stem operates as a stop member for said first piston, said stop head portion will move within said cap bush and away from said narrowed portion permitting said cap bush to abut the interior of one of said end caps when the second piston moves in the other direction in which said first threaded stem operates as the stop member for said first piston, both for opening and closing displacement of said valve.

2. An improved actuator according to claim 1, wherein said end of stroke limit means further comprise adjusting bolts engaging with said first and second stems to micrometrically adjust said stems and locking nuts to hold said stems in a set position.

* * * * *